Inventor
Stanley G. Murray
By Norris & Bateman
Attorneys

June 8, 1937.   S. G. MURRAY   2,083,391
AUTOMATIC FEEDING AND WEIGHING MACHINE
Filed Jan. 14, 1936   5 Sheets-Sheet 3

Inventor
Stanley G. Murray
By Norris & Bateman
Attorneys

June 8, 1937.  S. G. MURRAY  2,083,391
AUTOMATIC FEEDING AND WEIGHING MACHINE
Filed Jan. 14, 1936   5 Sheets-Sheet 4

Inventor
Stanley G. Murray
By Nason & Bateman
Attorneys

Inventor
Stanley G. Murray
By Norris + Bateman
Attorneys

Patented June 8, 1937

2,083,391

UNITED STATES PATENT OFFICE 2,083,391

AUTOMATIC FEEDING AND WEIGHING MACHINE

Stanley G. Murray, Passaic, N. J.

Application January 14, 1936, Serial No. 59,131

22 Claims. (Cl. 249—2)

The present invention relates to machines for feeding and weighing materials and more especially to those of the automatic type adapted for use in feeding and weighing loose material, such as grains, feeds, coal, sand, minerals and the like while the same is fed in the form of a stream.

One of the primary objects of the invention is to provide means for automatically regulating the stream of material to compensate for variations in the specific gravity of the material.

A more particular object of the invention is to provide means for automatically regulating the stream of material in a machine which measures the stream into separate loads or charges and check-weighs the load, in order to maintain automatically the correctness of the weight of the loads.

Another more particular object of the invention is to provide means for automatically regulating the stream of material in a machine in which the stream advances continuously and is weighed during its travel, in order to automatically maintain constant weight of the stream for a given unit of length thereof.

Another object of the invention is to provide means for metering or calibrating the amount of material passing through the machine in a given time and for registering the total amount of material that has passed through the machine.

To these and other ends the invention consists in certain improvements and combinations and arrangements of parts all as will be hereinafter described, the features of novelty being pointed out particularly in the claims at the end of this specification.

In the accompanying drawings:

Figure 5 is a detail view of the gearing for driving the feed conveyor intermittently;

Figure 9 is a diagram showing the electrical connections between the elements of the stream regulating means;

Similar parts are designated by the same reference characters in the different figures.

Figure 1:
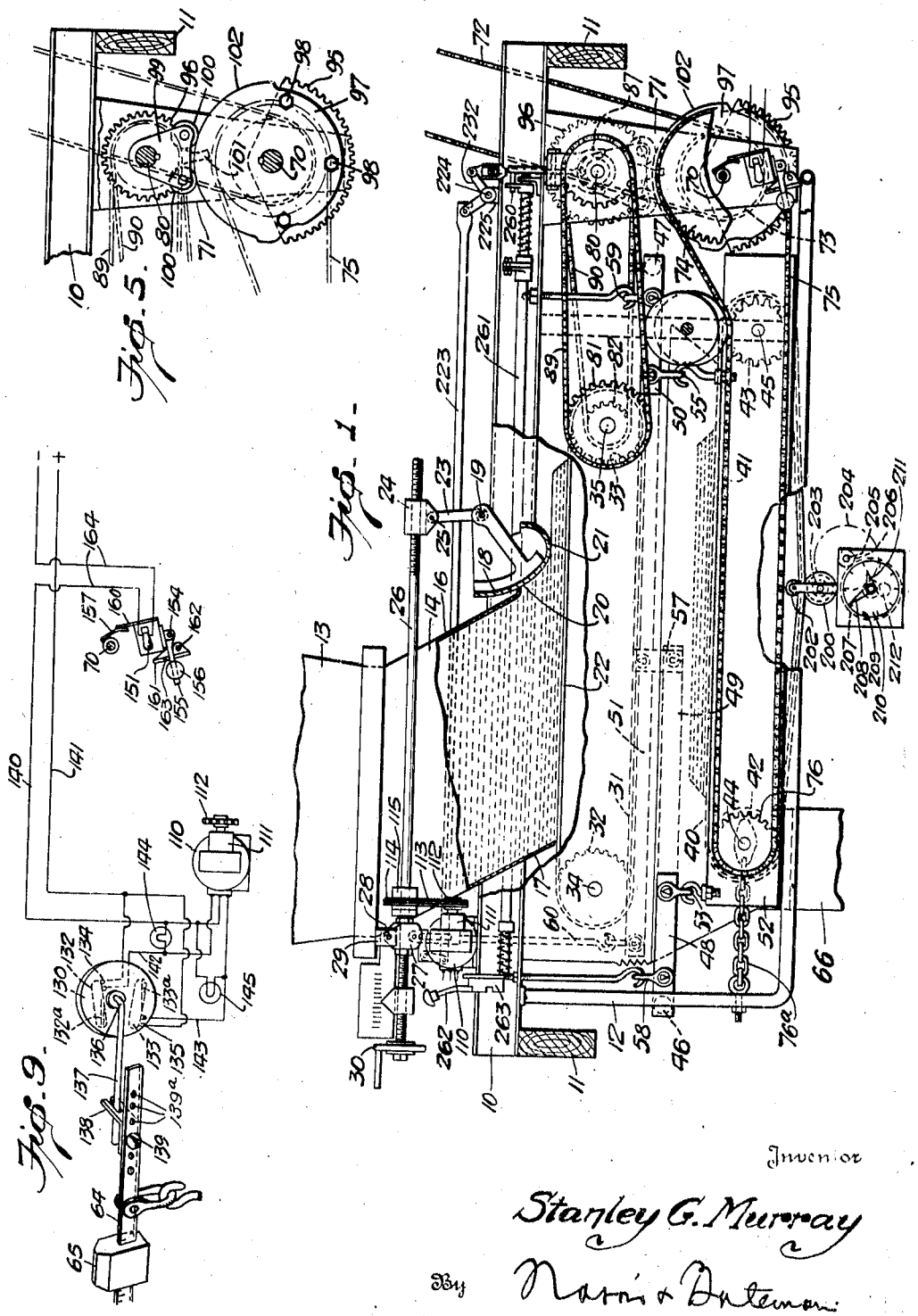
Figure 1 is a side elevation, partly in section, of a load measuring and check-weighing machine embodying the present invention.

The preferred embodiments of the invention are shown in the accompanying drawings and will be hereinafter described in detail, but it is to be understood that the invention is not restricted to the precise constructions shown since equivalent constructions are contemplated and such will be included within the scope of the claims.

Figures 1 to 9 inclusive show the present invention applied to a machine for measuring a stream of material into loads and check-weighing such loads, as fully shown and described in my prior copending application Serial No. 3,848 filed January 28, 1935, to which reference is made for a detailed understanding of such machine.

For the purposes of the present invention, such machine may be described as comprising a main frame composed of a pair of channel irons 10 which serve to support the machine when installed, the ends of these channel irons resting for example upon a pair of cross beams 11, the main frame having a sub-frame 12 which is suspended from the channel irons 10 and serves to support certain parts of the machine, as will hereinafter appear.

The material in loose form is supplied to the machine from a bin 13 or the like to a feed hopper 14, which comprises a pair of vertical side plates 15 which are supported from the channel irons 10, an inclined front plate 16 and a rear plate 17. The flow of material from the feed hopper is governed or controlled by a feed gate 18 which extends across the width of the feed hopper and is mounted on and fixed to a shaft 19 which is journalled at its ends in the side plates 15. This feed gate is provided with a peripheral face 20 the upper portion of which is concentric with the axis of the shaft 19 so that it will maintain a relatively close fit against the lower edge of the front wall 16 of the feed hopper when the gate is adjusted into different positions, and the lower portion of the face 20 of the feed gate is preferably curved on a shorter radius than the concentric portion thereof, as indicated at 21, to present a smooth surface to the material passing beneath it as the material is withdrawn from the feed hopper by the feed conveyor 22. The mounting of the feed gate 18 at the outlet beneath the lower edge 16 of the feed hopper enables this gate to regulate or govern the amount of material discharged from the feed hopper by adjustment of the gate into different vertical positions about the axis of the shaft 19, it determining the depth of the stream of material on the feed conveyor 22. The shaft 19 to which the feed gate is fixed is provided at one end with a bent arm or crank 23 to which an internally threaded nut 24 is connected pivotally at 25, and a screw shaft 26 is journalled to rotate in a bearing 27 pivotally suspended at 28 to a relatively fixed cross member 29 suitably supported from the channel irons 10. One end of the screw shaft is threaded into the nut 24 and its other end is provided with a hand wheel 30 by means of which it may be rotated manually and thereby caused to act through the nut 24 and crank arm 23 to swing the feed gate into different adjusted positions about the axis of the shaft 19 as a center.

The feed conveyor 22, which is of the endless flexible belt type, is preferably carried on endless chains 31 connected by cross members, and these chains pass around sprocket wheels 32 and 33 fixed on shafts 34 and 35, these shafts being mounted in suitable bearings supported from the channel iron members 10. The feed conveyor 22 is thus mounted to travel horizontally or substantially so in the machine and its upper stretch is located immediately below the feed hopper 14 so that the material in the feed hopper will rest on the upper stretch of the feed conveyor and will be withdrawn from the feed hopper beneath the edge of the hopper wall 16 and feed gate 18 by the travel of the feed conveyor 22 toward the right in Figure 1, the material thus withdrawn from the feed hopper traveling therewith. The vertical adjustments of the feed gate 18 vary its height above the upper stretch of the feed conveyor 22 and thereby vary the depth of the stream of material withdrawn by the feed conveyor from the feed hopper.

A weigh conveyor 40 is mounted beneath the feed conveyor to receive material therefrom, the weigh conveyor being of the endless flexible belt type carried on chains 41 and cross members connecting them, these chains passing around sprocket wheels 42 and 43 fixed on shafts 44 and 45. The weigh conveyor 40 is scale supported from the main frame of the machine by weighing mechanism comprising a pair of beams 46 and 47, the beam 46 having a short arm 48 at one side of the machine and a long arm 49 rigidly connected thereto and located at the opposite side of the machine, and the beam 47 having a short arm 50 at one side of the machine and a longer arm 51 rigidly connected thereto and located at the opposite side of the machine adjacent to the beam arm 49. The shafts 44 and 45 which carry the weigh conveyor 40 are mounted in suitable bearings in a frame 52. This frame is suspended at one end from the arms 48 and 49 of the weigh beam 46 by clevises 53 and 54, and the other end of the frame 52 is suspended by clevises 55 and 56 from the arms 50 and 51 of the weigh beam 47. The arm 51 of the weigh beam 47 is connected to the long arm 49 of the weigh beam 46 by a link 57 so that the beams 46 and 47 will support the frame 52 and the weigh conveyor 40 thereon for vertical movements equidistantly at both ends while the weigh conveyor remains horizontal or substantially so. Clevises 58 and 59 suspend the weigh beams 46 and 47 from the channel iron members 10. The extremity or free end of the arm 51 of the weigh beam 47 is connected by a link 60 to the short arm of a scale beam 61, the latter being pivotally suspended by its knife edges 62 from a relatively fixed bracket 63 supported on the cross member 29, and the long arm 64 of the scale beam has a sliding weight 65 mounted thereon, this arm of the scale beam being provided with graduations to represent weights to suit the size and capacity of the machine and to indicate the corresponding positions to be occupied by the weight 65. It will be understood that when the weigh conveyor 40 is empty or does not contain a full load of material, the long arm 64 of the scale beam will occupy its lowered position, that when the weigh conveyor contains a load of material equal to the weight for which the sliding weight 65 is set, the long arm 64 of the scale beam will come to a poise or mid-position, and that when the weigh conveyor contains a load of material in excess of that for which the weight 65 is set, the long arm 64 of the scale beam will occupy an upper or raised position.

According to the embodiment of the invention shown in Figures 1 to 9 inclusive, the feed conveyor 22 is driven or advanced intermittently through a definite distance to measure loads of material of predetermined volume and to discharge such loads onto the weigh conveyor 40, and the weigh conveyor is driven continuously and it weighs the loads individually while advancing them to the discharge point at which may be located a delivery chute 66. The driving means for so operating the feed and weigh conveyors, as shown in the present instance, comprises a main drive shaft 70 journalled in bearings provided in side members 71 supported on the channel iron members 10, this shaft being driven continuously by a motor or from a line shaft through a sprocket chain 72 and a cooperating sprocket wheel 73 fixed on the shaft 70. A sprocket wheel 74 is fixed on the shaft 70 and is connected by a chain 75 to a driving sprocket wheel 76 fixed on the shaft 44 for the weigh conveyor, so that the latter will be driven continuously from the shaft 70 and its upper stretch will move toward the left in Fig. 1. A drag link or chain 76ª pivotally connects the frame 52 of the weigh conveyor to the sub-frame 12, this drag link or chain extending horizontally or in parallelism with the pull of the driving chain 75 so that the frame 52 by which the weigh conveyor is scale supported will not be displaced by the pull of the driving chain and the vertical weighing movements of the weigh conveyor may take place without interference.

The continuously driven main shaft 70 is connected to a counter-shaft 80 which is journalled in suitable bearings in the side members 71 by an intermittent gear mechanism which causes the counter-shaft 80 to rotate intermittently and to a definite extent at each rotation. The counter-shaft 80 is connected to the feed conveyor 22 and serves to advance it intermittently a predetermined or definite distance at each operation. As shown in the present instance, the shaft 35, which drives the feed conveyor 22 has sprocket wheels 81 and 82 of different diameters fixed thereon and the counter-shaft has a pair of sprocket wheels 83 and 84 of different diameters thereon and jaw clutches 85 and 86 controlled by a clutch shifting fork 87 and lever 88 serve to operatively connect one or the other of the sprocket wheels 83 and 84 to the counter-shaft 80 so as to be driven thereby, the sprocket wheels 83 and 84 being connected to the sprocket wheels 81 and 82 on the shaft 35 by chains 89 and 90, so that the feed conveyor 22 will be advanced intermittently in conformity with intermittent rotations of the counter-shaft 80 and through different predetermined distances in order to adapt the machine to the measuring and weighing of loads of different weights, as shown and described in detail in my prior co-pending application hereinbefore referred to.

Figure 12:
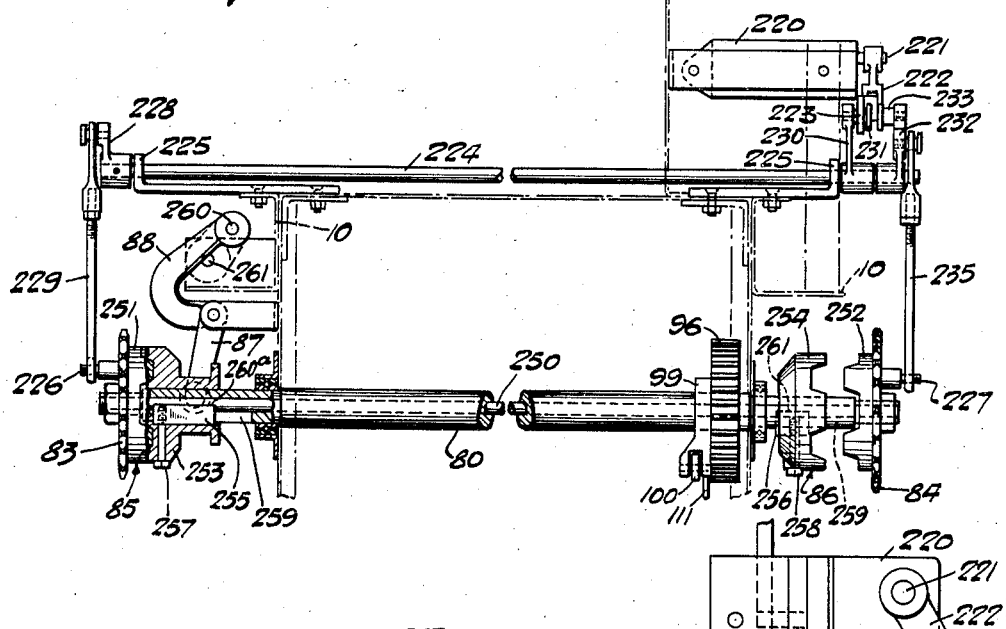
Figure 12 is a transverse section through a portion of the machine shown in Figs. 1 to 9 inclusive, showing counter operating means for counting the number of cycles or measured weighings.

Such means for advancing the feed conveyor through different predetermined distances is best shown in Figure 12 wherein the shaft 80 on the ends of which the sprocket wheels 83 and 84 of different diameters are mounted loosely, is hollow and contains a rod 250 which is reciprocable therein. The sprocket wheels 83 and 84 have jaw clutch members 251 and 252 fixed thereon, and jaw clutch members 253 and 254 are splined on the shaft 80, they being connected to the respective ends of the rod 250 by keys 255 and 256 which are fixed to the respective jaw clutch members 253 and 254 by screws 257 and 258 and extend slidingly through slots 259 in the ends of the shaft 80 and seat in recesses 260ª and 261 in the respective ends of the rod 80. The jaw clutch members consequently will be shifted simultaneously in one direction by the rod 250 to engage the clutch members 251 and 253 and thereby establish a driving connection between the smaller sprocket wheel 83 and the shaft 80 and simultaneously disengage the clutch members 252 and 254 and thereby disconnect the shaft 80 from the larger sprocket wheel 84 so that the latter may revolve freely, and when the rod 250 is shifted in the opposite direction, the clutch members 252 and 254 will be engaged, thereby establishing a driving connection for the larger sprocket wheel 84 and simultaneously the smaller sprocket wheel 83 will be disconnected from the shaft 80 so that this sprocket wheel will revolve freely on said shaft. The jaw shifting rod is shifted by the lever 88 which is connected by a pin 260 thereon to a rotatable shaft 261 which extends longitudinally of the machine and is provided at the opposite end of the machine with a lever 262 which enables the operator to set the clutches to connect the sprocket wheel 83 or 84 to the shaft 80, according to whether the feed conveyor is to be advanced at a lower or higher speed or through a relatively shorter or longer distance at each operation thereof, and a notched segment 263 may be provided for locking the lever 262 in one or the other of its operating positions.

The intermittent driving means between the continuously driven main shaft 70 and counter-shaft 80, as shown in the present instance, is the same as that disclosed in detail in my prior co-pending application referred to, it being deemed sufficient for the purposes of the present invention to explain that such intermittent driving means comprises a segmental or interrupted gear 95 which is keyed or otherwise fixed on the shaft 70 so as to revolve in unison therewith, a cooperating gear 96 keyed or otherwise fixed on the intermittently rotatable counter-shaft 80, a disk 97 fixed to one side of the gear 95 as by bolts 98 so that this disk is spaced laterally from said gear, and an arm 99 which is fixed to the gear 96 or to the shaft 80 so as to rotate therewith, this arm carrying a pair of rollers 100 arranged to ride on the periphery of the disk 97, a tooth or finger 101 being fixed to the gear 96 and arm 99 to rotate therewith, this finger being located in a plane to operate in the space formed between the gear 95 and disk 97. The portion of the disk 97 opposite to the untoothed portion of the gear 95 is formed with a cam surface 102 on its periphery which is concentric with the shaft 70, and the rollers 101 are adapted to ride on this cam portion during a part of each revolution of the shaft 70, this cam portion 102 and the cooperating rollers 100 then locking the shaft 80 against rotation while the feed conveyor 22 is at rest. During each revolution of the main shaft 70, the bolt 98 adjacent to the leading end of the segmental gear 95 will engage the tooth 101 and thereby initiate rotation of the shaft 80, immediately following which the gear 95 will mesh with the gear 96 and the meshing of these gears will cause rotation of the shaft 80 until the gear 95 passes out of mesh with the gear 96, whereupon the rollers 100 will come into engagement with the concentric cam portion 102 of the disk 97 and the shaft 80 will be held against rotation until it is again rotated by the following revolution of the main shaft 70. The feed conveyor 22 will thus be advanced intermittently by the intermittent rotations imparted to the counter-shaft 80, thereby withdrawing a stream of material of definite volume from the feed hopper and thus measuring a load of material volumetrically during each advance of the feed conveyor, the loads of material thus measured by the feed conveyor being discharged therefrom onto the weigh conveyor 40, and the weigh conveyor check-weighs the loads individually as they are delivered thereto by the feed conveyor, through the operation of the weighing mechanism which supports the weigh conveyor.

When no load or a short load is contained on the weigh conveyor, the weighted long arm 64 of the scale beam will be in lowered position; when the weigh conveyor contains a full or complete load, the arm 64 of the scale beam rises under its influence and if the load on the weigh conveyor is correct, the scale beam balances or comes to a poise. When the load on the weigh conveyor is too heavy or is in excess of the predetermined weight desired or for which the weight 65 is adjusted, the long arm 64 of the scale beam swings upwardly above its balanced or poised position. Regulation of the stream fed by the feed conveyor to bring the loads measured by it to the proper or desired weight, is effected by raising or lowering the feed gate 18 by rotation of the screw shaft 26.

The machine as thus far described is constructed and operates as set forth in my prior co-pending application hereinbefore referred to, but in the machine according to that application, manual adjustment of the feed gate by an attendant was required to maintain the measured loads at the correct or desired weight. The present invention provides means for automatically regulating the stream of material supplied by the feed conveyor whereby correct weight of the loads will be maintained automatically or without requiring the attention of an attendant.

According to the present invention, means is provided for adjusting the feed gate 18 automatically in response to the position occupied by the scale beam. In the embodiment of the invention shown in Figs. 1 to 9 inclusive, a reversible electric motor 110 is provided which is mounted on a relatively fixed part of the main frame of the machine, this motor having a worm or other suitable reduction gearing 111 connected to its shaft, the reduction gearing having a sprocket wheel 112 fixed thereon and connected by a chain 113 to a sprocket wheel 114 which is connected to the screw shaft 26 which adjusts the feed gate 18. The sprocket wheel 114 is preferably connected to the shaft 26 by a slip clutch which comprises a collar 115 fixed on the shaft 26 as by a set screw 116 and having a suitable number of balls 117 mounted loosely in bores 118 formed in said collar, said bores containing springs 119 which bear against the balls 117 and tend to force them laterally against the sprocket wheel 114 which is mounted rotatably on a hub 120 which extends from the collar 115. The sprocket wheel 114 has a face adjacent to the collar which is provided with an annular row of recesses or depressions 121 into which the balls 117 are forced yieldingly by the springs 119. A collar 122 fixed on the hub 120, as by a set screw 123, serves to hold the sprocket wheel 114 in cooperative relation with the collar 115 and to sustain the thrust of the springs 119. The slip clutch thus provided for connecting the electric motor 110 to the feed gate adjusting screw shaft 26 will transmit motion from the motor to the screw shaft to effect the adjustments of the feed gate and it will also enable the screw shaft 26 to be adjusted quickly by the hand wheel 30 when relatively great manual adjustments of the feed gate are desired, and this slip clutch also provides a safety drive of the screw shaft 26 by the electric motor to prevent damage should the electric motor, from any cause, act to further open or close the feed gate when the feed gate is fully open or closed.

The operation of the electric motor is governed or controlled automatically by an electric switch mechanism 130 which is responsive to the weighing movements of the scale beam. This switch mechanism comprises a disk or other suitable rotatable support 131 on which a pair of mercury switches 132 and 133 are mounted, each of these switches being of a suitable well known construction comprising a tube having electrodes at one end and containing a body of mercury movable by endwise tilting of the tube, into and out of contact with the electrodes. The switches 132 and 133 are mounted at reverse inclinations on the supporting disk 131 and the electrodes 134 and 135 thereof are located at relatively opposite ends, so that when the disk 131 is in an intermediate position in its rotation the bodies of mercury 132ª and 133ª in both switches will be at the ends thereof opposite to the electrodes and the circuits through both switches will be open, but when the supporting disk 131 is rotated in one or the other direction from such position, the consequent tilting of the mercury switches will cause the bodies of mercury therein to flow into contact with the electrodes in one or the other of the switches, according to the direction in which the switches are tilted. The switch supporting disk or member 131 is fixed on a supporting shaft 136 which is suitably journalled in a stationary casing 136ª on the machine, this shaft having an arm 137 which extends radially therefrom and engages a fork 138 carried by the long arm 64 of the scale beam. In order to adjust the range of rotation of the switch, the fork 138 is mounted adjustably on the scale beam as by a clamping screw 139 which may be engaged in one or another of a series of holes 139ª located at different points in the length of the scale beam.

One of the terminals of the reversible electric motor 110 is connected by a conductor 140 to a source of electric current of suitable voltage, and one of the pair of electrodes 134 and 135 of the switches 132 and 133 is each connected by a conductor 141 to such source of electric current supply. The other of each of the pairs of electrodes 134 and 135 of the switches 132 and 133 are connected to the other terminals of the reversible electric motor 110 by conductors 142 and 143 respectively, and these conductors 142 and 143 preferably include in circuit therewith electric lamps 144 and 145 of different colors, the lamp 144 being for example red and the lamp 145 green.

Figure 2:
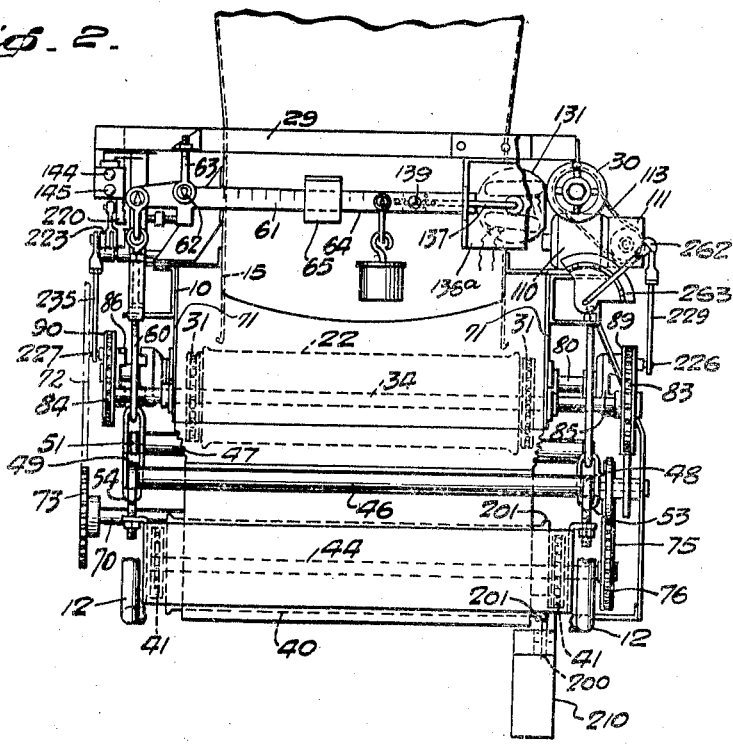
Figure 2 is an end elevation of the machine as viewed from the left in Fig. 1.

The switch mechanism as described will occupy its neutral position shown in Fig. 9, with the bodies of mercury in the switches 132 and 133 occupying the ends thereof opposite to the electrode ends thereof, when the scale beam 64 is in its intermediate or poise position, as when the load of material on the weigh conveyor 40 is of a weight corresponding to the setting of the weight 65 on the scale beam, and electric motor circuits through both of the switches 132 and 133 will then be opened and the electric motor will be idle. When the load of material on the weigh conveyor 40 is heavy or exceeds the weight for which the sliding weight 65 on the scale beam is set, the scale beam 64 will rise and the fork 138 thereon will swing the arm 137 upwardly, thereby rocking the switch 132 to or beyond a horizontal position so that the body of mercury therein will flow to the electrode end of the switch and bridge the electrodes 134. When the switch 132 is rocked into this position, the electric circuit for the motor 110 is closed or completed from the electric current supply conductor 141 through the electrodes 134 and conductor 142, thus causing the electric motor 110 to run in a direction which will rotate the screw shaft 26 in the proper direction to lower the feed gate 18, and at the same time the electric lamp 144 will be illuminated. When the switch 132 is thus rocked into circuit closing position, the switch 133 will occupy its open circuit position. When the weight of the load of the material on the weigh conveyor 40 is light or is less than that for which the sliding weight 65 on the scale beam is set, the scale beam will not rise to its poise position but will occupy its lowered position, and the arm 137 connected to the switch mechanism will rotate the same into a position which will tilt the electrode carrying end of the switch 133 downwardly, thereby causing the body of mercury in this switch to bridge the electrodes 135, whereby the electric motor circuit will be closed or completed between the electric current supply conductor 141 and the conductor 143, thereby causing the electric motor to run in the opposite direction than before, that is, in a direction to rotate the screw shaft 26 to raise the feed gate 18, and at the same time the electric lamp 145 will be illuminated. When the switch 133 is rocked into the last described or circuit closing position, the switch 132 will occupy its open circuit position. The electric lamps 144 and 145 may be mounted in a casing 146 attached to a suitable stationary part of the machine as shown in Fig. 2 in convenient position for visual observation by an attendant adjacent to the machine, or these indicating lamps may obviously be located at a suitable remote point.

Since, in the operation of the machine to measure the material intermittently into loads and to check-weigh such loads, the scale beam drops to its lower position after the discharge of each load from the weigh belt, the switch 133 will be tilted into circuit closing position at such times, and unless prevented, the electric motor 110 would be caused to run in a direction to open the feed gate 18 and thus increase the weight of the load supplied to the weigh belt by the feed belt, which would be undesirable, since the feed gate 18 might be properly adjusted for the feeding of loads of the desired weight and operation of the electric motor under such condition, by the dropping of the scale beam after the discharge of each weighed load from the weigh hopper, would disturb the adjustment of the feed gate. The present invention therefore provides means for so controlling the electric motor 110 through the switch mechanism 130 as to permit operation of said motor only during the short period of time the weighing of the load is taking place, that is, during the period of time the tail end of the measured amount of material from the feed conveyor has just settled upon the weigh conveyor and immediately before the head end of the load begins to discharge from the weigh conveyor, the controlling means being thus synchronized with the weighing operations of the scale beam and constituting a synchronizer for the switch mechanism governing the feed gate adjusting motor.

Preferably and as shown in the present instance, this synchronizer comprises a switch housing 150 which contains an electric switch 151 which is preferably of the mercury type comprising a glass or other tube containing a body of mercury 152 and having a pair of electrodes 153 at one end adapted to be bridged by the body of mercury when the switch is tilted to lower its electrode carrying end. The switch housing 150 is pivotally mounted on a relatively fixed pivot 154 supported on a stationary part of the machine, as on one of side members 71 so that the switch housing may rock in a vertical plane, or substantially so, and an arm 155 rigid with the switch housing extends from one side of the pivot 154 and carries a weight 156 which acts to tilt the switch and its housing into the position shown in Fig. 6 and to normally hold it in such position, the switch 151 then occupying its open circuit position. The switch housing is mounted below or otherwise adjacent to the continuously rotating main drive shaft 70, and means is provided for rocking the switch housing 150 to tilt the switch 150 into circuit closing position once for each revolution of the shaft 70. The means shown for this purpose in the present instance comprises a cam or arm 157 which is fixed to a collar 158, the latter being fixed to the shaft 70, as by a set screw 159, so that the arm 157 projects from the shaft 70 at the proper position around its circumference, and the switch housing 150 is provided with an arm or blade 160 which is in the path of movement of the cam or arm 157, so that during each revolution of the shaft 70, the cam or arm 157 will engage the arm 160 and rock the switch housing 150 in opposition to the influence of the weight 156, to tilt the switch 151 sufficiently to cause the body of mercury 152 therein to bridge the electrodes 153 of this switch, thereby completing or closing an electric circuit therethrough. The cam or arm 157 is set at such an angle circumferentially of the shaft 70 as to cause tilting of the switch 151 into circuit closing position at the moment the tail end of a measured load of material has just been delivered by the feed conveyor to the weigh conveyor and immediately before the head or leading end of the load on the weigh conveyor begins to discharge therefrom, the synchronizer being thus synchronized with the weighing mechanism which then functions to weigh the load of material on the weigh conveyor. The switch housing is supported in its normal inactive position and overthrow of the switch housing when rocked to tilt the switch 151 into circuit closing position is prevented by a stop 161 which may be mounted on side member 71 as by the pin or pivot 162, this stop having a vertical slot 163 of appropriate length, in which the weight carrying arm 155 operates, the lower end of the stop bearing on the stationary subframe 12 of the machine. The electrodes 153 of the switch 151 are connected in series with the conductor 140 which supplies electric current to the switch mechanism 130, by the conductors 164, the synchronizer thus controlling the switch mechanism 130 in such a manner that the circuits through both switches 132 and 133 will be open except during each moment the weighing mechanism is weighing a load on the weigh conveyor.

The operation of a measuring and check-weighing machine equipped with the automatic feed gate governing means and synchronizer as hereinbefore described and shown in Figures 1 to 9 inclusive is as follows:—The material to be measured and weighed is fed to the feed hopper 14 by the bin 13 and the machine is driven from the continuously revolving shaft 70. The sliding weight 65 is set in the proper position along the scale beam 61 to accord with the desired weight of the measured loads, and the screw shaft 26 is rotated manually by the hand wheel 30 to set the feed gate 18 at the proper height to control the depth of the stream of material withdrawn from the feed hopper by the feed conveyor 22 so that each advance of the feed conveyor through a definite distance will withdraw from the feed hopper and deposit onto the weigh conveyor 40 a load of material the weight of which corresponds with the setting of the sliding weight 65. During each revolution of the shaft 70, the countershaft 80 will have a revolution imparted to it through the meshing of the gear 95 with the gear 96, whereby the feed conveyor will be advanced through a definite distance, after which the counter-shaft 80 will be held against rotation and will be at rest, due to the engagement of the rollers 100 with the concentric cam portion 102 on the disk 97 fixed to the shaft 70. At this time, the feed conveyor will have measured a load of the material volumetrically and deposited it upon the weighing conveyor 40 which advances the load thereon continuously toward the discharge chute 66, and during the period of rest of the feed conveyor and while the entire load of material is contained on the weigh conveyor the weighing of the load is effected through the action of the weighing mechanism which supports the weigh conveyor and the scale beam 64. The operation of the machine as thus far described is the same as in my prior co-pending application hereinbefore referred to.

According to the present invention, the switch 151 of the synchronizer is in open circuit condition while the load of material is being deposited by the feed conveyor onto the weigh conveyor and while the load of material is being discharged from the weigh conveyor, or at all times except during the moment the entire load of material is on the weigh conveyor and is being weighed, during which moment the cam or arm 157 on the shaft 70 tilts the switch 151 into circuit closing position and thereupon allows this switch to return to its normal open circuit position. If the weight of the load of material on the weigh conveyor is correct or agrees with the setting of the sliding weight 65 on the scale beam, the latter will rise until it comes to a balance or poised position, and the weigh beam, acting through the arm 137, will rotate the switches 132 and 133 into the neutral position shown in Fig. 9, the bodies of mercury in these switches then occupying the ends of these switches opposite to the electrode ends thereof, so that both of these switches will then be in open circuit position, and the closing of the circuit through the switch 151 and supply conductor 141 will take place without causing operation of the electric motor 110 in either direction, and hence the feed gate 18 will remain in its adjusted position. If the load of material weighed on the weigh conveyor is short or lighter than that for which the sliding weight 65 is set, the scale beam will not rise and consequently the arm 137 of the switch mechanism will hold the switches 132 and 133 in tilted position, tilting the switch 133 so that the body of mercury therein bridges the contacts 135 of this switch, and at the moment the switch 151 tilts to close the circuit through the conductors 141 and 164, which takes place during the weighing period, the circuit through the conductors 141, electrodes 135, conductor 143, motor 110 and conductor 140 will be completed, thereby causing the motor 110 to run in a direction to rotate the screw shaft 26 in the proper direction to raise the feed gate 18 and thereby increase the depth of material on the feed conveyor 22. This operation increases the volume and weight of the next load of material fed by the feed conveyor to the weigh conveyor and this correcting operation may take place through several following measuring and checking operations until the feed gate has been adjusted to the proper height to effect the feeding of loads of the proper desired weight whereupon the correcting or compensating action will cease. At the same time the motor 110 is thus set into operation to correct the weight of the loads, the electric lamp 145, which may be green, in circuit with the conductor 143, will be illuminated, thus giving a visible indication that the machine is adjusting itself to rectify the condition that the loads passing through the machine are light. If the load of material on the weigh conveyor is heavy or in excess of that for which the weight 65 is set, the scale beam 64 will rise above its balanced or poised position, thereby tilting the switch 132 sufficiently to cause the body of mercury therein to bridge the electrodes 134 of this switch, and at the moment the weighing operation takes place, that is, while the entire load of material is on the weigh conveyor, the switch 151 is tilted to complete the circuit through the conductors 141 and 164, and since the closing of the circuit through the switch 132 completes the circuit through the conductor 140, motor 110 and conductor 142, the motor 110 will then be caused to run in the opposite direction than before, or in a direction to rotate the screw shaft 26 in a direction to lower the feed gate 18 and thereby diminish the depth of the material on the feed conveyor, thus correcting the weight of the next succeeding load or loads, such correcting operation taking place during each closing of the circuit through the switch 151 until the feed gate has been adjusted to the proper height to bring the loads of material to the proper weight. When the circuit is thus closed through the switch 132, the electric lamp 144, which may be red, is illuminated, thus giving a visible indication that the machine is adjusting itself to rectify the condition that the loads passing through the machine at that time are heavy.

By thus synchronizing the completion of the circuit for the motor 110 with the weighing operations as they take place in the machine, operation of the motor 110 to alter the adjustment of the feed gate 18 to raise the feed gate, which would otherwise take place each time a load is discharged from the weigh conveyor due to the descent of the scale beam 64 to its lower position, and which would be objectionable since it would tend to adjust the feed gate to compensate for a light or short weight load whereas the adjustment of the feed gate may be correct, is avoided. Moreover, the periodic closing of the controlling circuit for the electric motor by the synchronizer causes the correcting or compensating adjustments for the feed gate to be made by increments, thus insuring accuracy in the compensating action.

The automatic adjusting means for the feed gate and the cooperative synchronizer provided by the present invention may also be applied to a machine in which the material is fed and weighed while it travels continuously and as a continuous stream through the machine. In applying the invention to a machine of that type, the machine may be constructed the same as shown in Figs. 1 to 9 inclusive with the exception that the feed conveyor 22, instead of being advanced intermittently and the loads measured thereby formed individually and weighed separately, the feed conveyor 22 may be advanced continuously. For example, the continuously running main shaft 70 may have a continuous gear 195 fixed thereon and meshing with a continuous gear 196 fixed on the counter-shaft 80 so that the latter would drive the feed conveyor 22 continuously. In such an application of the invention, the material would be withdrawn from the feed conveyor 14 in a continuous stream and deposited continuously on and discharged continuously from the weigh conveyor 40. The sliding weight 65 on the scale beam would be set to balance the desired weight of the length of the stream of material on the weigh conveyor, and while such length of the stream of material is of the desired weight, the scale beam 64 will remain in a balanced or poised position, the switches 132 and 133 will both be in open circuit position, and although the motor circuit will be closed through the switch 151 during each revolution of the shaft 70, the motor 110 will remain idle so that no change in the adjustment of the feed gate 18 will take place. However, should the weight of the length of the stream of material on the weigh conveyor become lighter than desired or for which the weight 65 is set, the scale beam 64 will move downwardly out of its balanced or poised position, thereby rocking the switch 133 into circuit closing position, and when the switch 151 is rocked into circuit closing position, the circuit through the motor 110 will be closed so that the motor will run in a direction to turn the screw shaft 26 in a direction to raise the feed gate 18 and thereby increase the depth of the stream of material being withdrawn from the feed hopper by the feed conveyor, and if the weight of the length of the stream of material on the weigh conveyor becomes heavier than that desired or for which the weight 65 on the scale beam is set, the scale beam will rise from its balanced or poised position, thereby rocking the switch 132 into circuit closing position, and when the switch 151 is rocked into circuit closing position, the circuit will be completed through the motor 110 so as to cause said motor to run in a direction to turn the screw shaft in a direction to lower the feed gate 18 and thereby diminish the depth of the stream of material being withdrawn from the feed hopper by the feed conveyor. In either instance, (the closing of the circuit through the switch 133 by descent of the scale beam from its balanced position or the closing of the circuit through the switch 132 by the rising of the scale beam from its balanced or poised position), the motor circuit through one or the other of these switches, as the case may be, will be completed only periodically through the switch 151, so that the motor 110 will operate periodically to correct the adjustment of the gate 18 by increments, thereby avoiding any over-adjustment of the gate in either direction, or a "hunting" or "wandering" action which would otherwise take place if the synchronizing switch 151 were not employed and the motor controlled by the switches 132 and 133 alone. Consequently, when the stream of material passing through the machine becomes lighter or heavier than a predetermined desired weight for a given unit of length of the stream, the feed gate will be adjusted in the proper direction, by increments, until the scale beam returns to a balanced or poised position corresponding with the predetermined desired weight of the stream for a given unit of length thereof according to the setting of the weight 65. The automatic gate adjusting means provided by the present invention, as applied to a continuous feeding and weighing machine of the type just referred to thus serves to automatically maintain the scale beam in balanced or poised position or to restore it to such position, by adjusting the feed gate and thereby regulating the depth of the stream of material fed by the feed conveyor.

Figure 11:
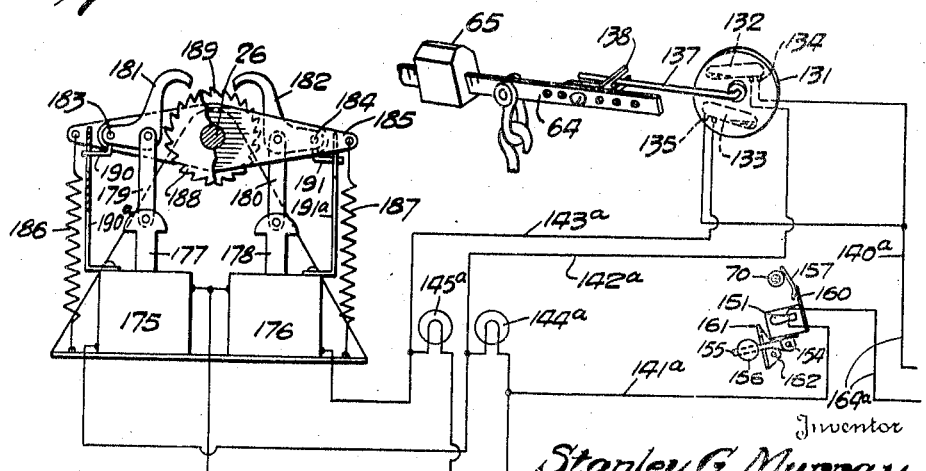
Figure 11 is a view showing a modified form of regulating motor, showing the electrical connections for governing its operation.
Figure 3:
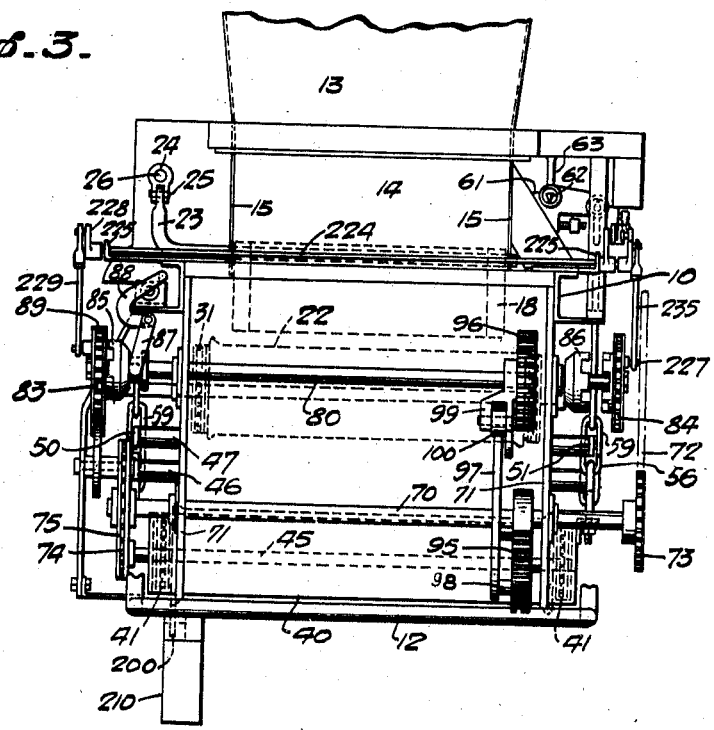
Figure 3 is an end elevation of the machine as viewed from the right in Fig. 1.
Figure 4:
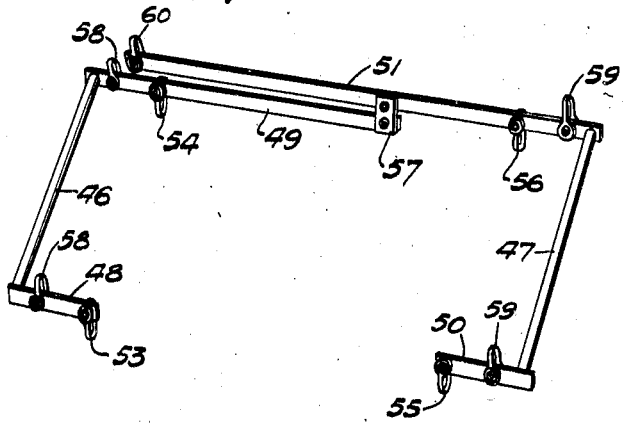
Figure 4 is a detail perspective view of the scale mechanism which supports the weighing conveyor.
Figure 10:
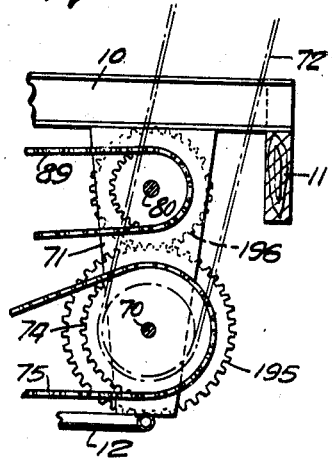
Figure 10 is a view similar to Fig. 5 but showing gearing for driving the feed conveyor continuously.
Figure 7:
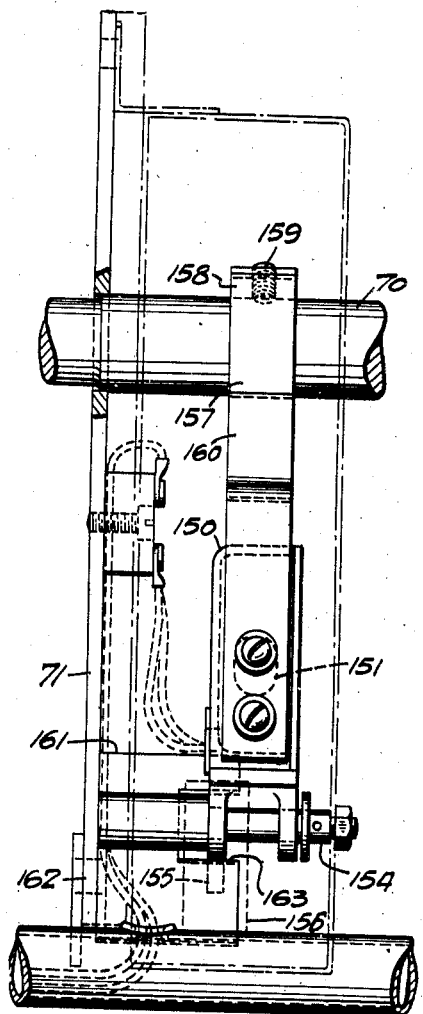
Figure 7 is an elevation of the controller or synchronizer shown in Fig. 6 as viewed from the left in that figure.
Figure 6:
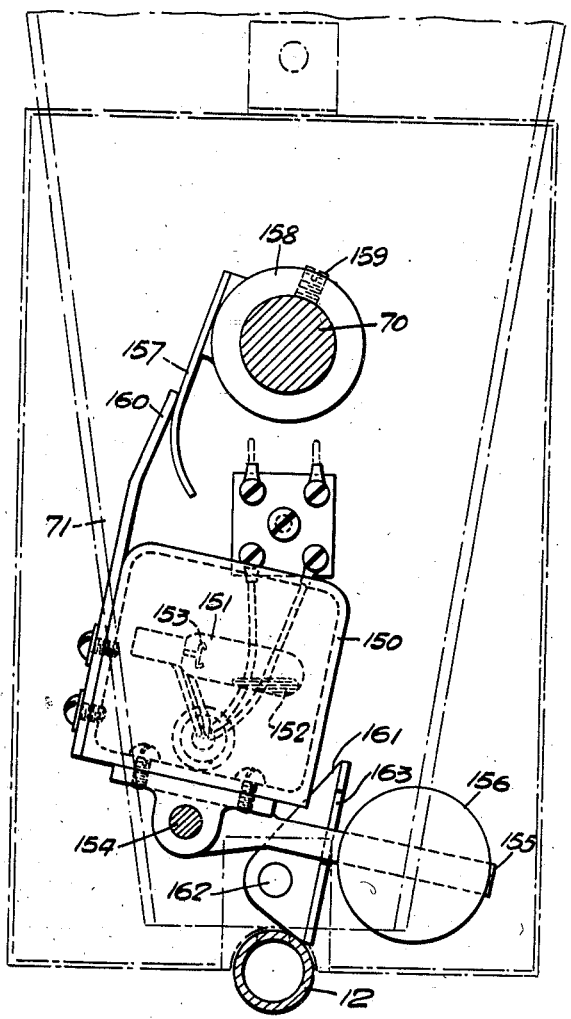
Figure 6 is a detail view on an enlarged scale of the controller or synchronizer for the automatic stream regulating means.
Figure 8:
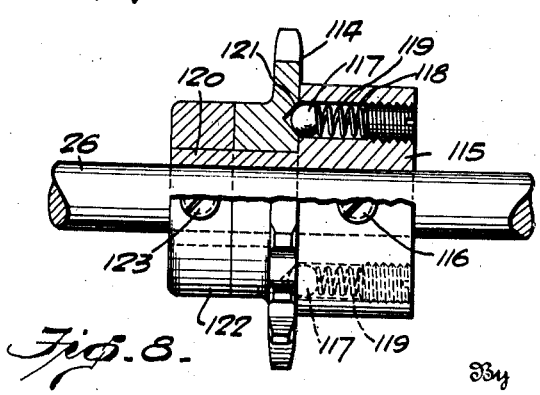
Figure 8 is a detail view on an enlarged scale and partly in section, of the driving clutch between the regulating motor and the regulating shaft.

The invention is not limited to the use of a reversible rotatable electric motor as hereinbefore described, since other types of gate operating motors may be employed. For example, Fig. 11 shows a motor or equivalent gate adjusting device which comprises a pair of solenoids 175 and 176 having cores 177 and 178 respectively reciprocable therein. The solenoid cores 177 and 178 are operatively connected by links 179 and 180 to a pair of pawls 181 and 182, these pawls being of bell crank form and pivoted at 183 and 184 respectively to a cross-head 185 which is mounted rockably or rotatably on the screw shaft 26, a pair of balanced springs 186, 187 normally and yieldingly holding the cross-head 185 in its horizontal or neutral position. A pair of toothed wheels 188 and 189 are fixed on the screw shaft 26 and are arranged to be engaged by the pawls 181 and 182 respectively. In using such a motor, the switches 132 and 133 of the switch mechanism 130 responsive to the weighing movements of the scale beam 64 would have one of each pair of their electrodes 134 and 135 connected respectively to the solenoids 175 and 176 by the conductors 142ª and 143ª which may have electric lamps 144ª and 145ª of different colors connected therein, the solenoids being connected by the conductor 141ª to the synchronizing switch 151 controlled from the shaft 70 as hereinbefore described, the switch 151 being connected to one side of a source of electric current supply by a conductor 164ª, and the conductor 140ª connecting the other side of the source of electric current supply to the other electrodes of the switches 132 and 133.

The control of the solenoid type of electric motor shown in Fig. 11 is substantially the same as the control of the motor 110 as hereinbefore described and in operation, when the switch 132 is rocked into circuit closing position by the rise of the scale beam 64 above its balanced or poised position, each time the switch 151 is tilted into circuit closing position by the shaft 70, the solenoid 175 will be energized thereby pulling its core or armature 177 downwardly, causing the pawl 181 connected thereto to move into engagement with its toothed wheel 188 and to then act on said wheel to rotate the screw shaft 26 in a direction to cause lowering of the feed gate 18; and when the scale beam occupies a position below its balanced or poised position, the switch 133 will be rocked into circuit closing position, and when the switch 151 is tilted into circuit closing position by the shaft 70, the circuit will be completed through the solenoid 176, and the core or armature 178 thereof will then be pulled downwardly, pulling the pawl 182 connected thereto into engagement with its toothed wheel 189 and then rotating such wheel and the screw shaft 26 in the direction to cause raising of the feed gate 18. In either case where the circuit is closed through the switch 132 or 133, the impulses of current produced in the respective solenoid through the periodic closing of the switch 151 will cause successive actuations of the respective toothed wheel 188 or 189 to effect a step by step adjustment of the feed gate until the scale beam is restored to a balanced or poised position. The springs 186 and 187 act to restore the pawls 181 and 182 to their initial positions after each actuation thereof, and fingers 190 and 191 fixed to and projecting outwardly from the pawls 181 and 182 and working in vertical slots in brackets 190ª and 191ª fixed to the respective solenoids serve to disengage said pawls and to hold them out of engagement with the respective toothed wheels 188 and 189 by engagement of these fingers with the upper ends of their slots when the solenoids are de-energized and the springs 186 and 187 restore the cross-head 185 to its normal position, so that the screw shaft 26 will normally be in condition for manual rotation by the hand wheel 30, when relatively large adjustments of the feed gate are to be made manually, without interference from the pawls. While the scale beam occupies its balanced or poised position during the weighing operations or at the moments the circuit is closed by the tilting of the switch 151, both solenoids will be de-energized and the pawls will be inactive and in disengaged relation with their respective toothed wheels. In this embodiment of the invention, the electric lamps 144ᵃ and 145ᵃ which are of different colors, will be illuminated to indicate short weight or excess weight of the weighed loads or stream. It is to be understood that the solenoid type motor and controlling means shown in Fig. 11 is equally applicable to a machine which intermittently measures loads and check-weighs them and to machines in which the material is fed continuously and weighed while in the form of a continuous stream.

Figure 13:
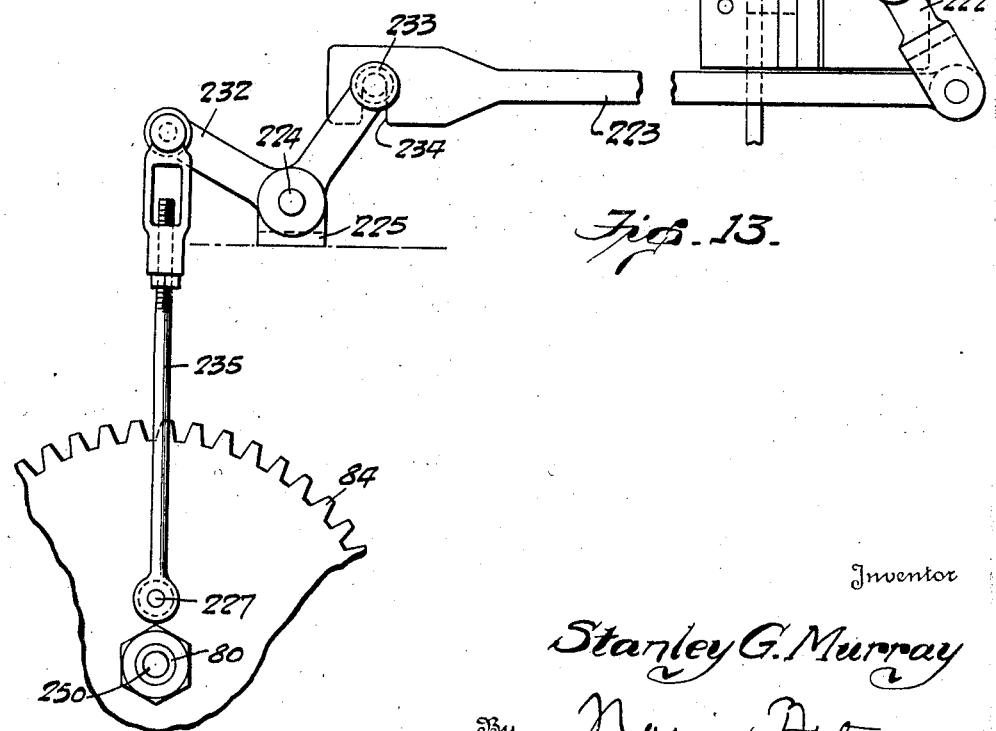
Figure 13 is a detail view showing the operative connection between the counter operating rod and its actuating means.

The intermittently operating machine, as shown in Figs. 1 to 9 inclusive is preferably provided with a counter attachment for counting the number of cycles or measured weighings. As shown in Figs. 12 and 13, the counter 220 which may be of any suitable and well known construction having a rock shaft 221 for actuating it, is mounted in a suitable position on the machine and its rock shaft is provided with a crank 222 to which one end of an operating rod 223 is connected pivotally. A rock shaft 224 is pivotally mounted in bearings 225 on the main frame of the machine, said shaft extending transversely of the machine above the high and low speed sprockets 83 and 84, and these sprockets are provided with crank pins 226 and 227 respectively. The shaft 224 has a crank arm 228 fixed to one end thereof, this crank arm being operatively connected to the crank pin 226 on the low speed sprocket 83 by a connecting rod 229 and the other end of the shaft 224 has a crank arm 230 fixed thereon and provided with a crank pin 231. A bell-crank lever 232 is mounted loosely on the shaft 224 adjacent to the crank arm 230 thereon, one arm of this bell-crank lever having a crank pin 233 which is opposite to the crank pin 231, and the other arm of said bell-crank lever is operatively connected to the crank pin 227 on the high speed sprocket 84 by a connecting rod 235. The operating rod 223 is provided with a slot 234 by which this rod may be operatively engaged with one or the other of the crank pins 231 or 233, for actuation of the counter once for each advance of the feed conveyor, according to whether the high speed or low speed sprocket is in operation.

Means is provided for metering or calibrating the amount of material passing over the weigh conveyor 40 and for indicating the grand total thereof. This device as shown comprises a grooved roller 200 which frictionally engages and is driven by the flange 201 on an edge of the belt forming the weigh conveyor 40, it being held in frictional driving relation therewith by a freely rotatable roller 202 which engages the side of the belt opposite to the roller 200. The roller 200 is connected to a gear 203 of small size which meshes with a relatively larger gear 204 on a shaft 205, and a relatively smaller gear 206 is fixed to the gear 204 and meshes with a relatively larger gear 207. The gear 207 is connected to an indicating hand 208 which cooperates with graduations 209 on a dial 210, and a second hand 211 is connected to the hand 208 by suitable reduction gearing 212 and cooperates with the dial graduations 209. The gearing connecting the roller 200 with the hands 208 and 211 is of such total ratio that the indicating hands or pointers will count and indicate the number of times a given effective length of the belt forming the weigh conveyor has traveled around. When applied to a machine in which the material passes continuously in a stream and the stream is weighed, as hereinbefore described, the metering or calibrating device may indicate the total amount of material passing through the machine in a given time, since the automatic feed gate adjusting means provided by the present invention will hold the scale beam in balance so that the weight of the stream for a unit of length will be maintained constant, and by driving the weigh conveyor at a constant speed, a given amount of material will pass through the machine in a given time and will be indicated by the metering device. The metering or calibrating device may be mounted and supported directly on the frame 52 carrying the weigh conveyor, as by a supporting bracket 214 fixed to said frame and supporting the metering device and its gearing, or the dial and the indicating hands associated therewith may be located at a distant or other point and driven by a flexible drive from the gearing driven by the belt of the weigh conveyor.

The automatic regulating means provided by the present invention compensates for variations in the weight of the stream of material, due to variations in specific gravity, dampness resulting from atmospheric conditions or other causes, as the material passes through the machine, thus obviating the necessity of manual adjustment by an attendant.

The synchronizer forming part of the regulating means insures close and accurate regulation and avoids "hunting" or "wandering", since the adjusting means is rendered operative periodically or at such intervals that the weighing of the material occurs after each load or portion of the stream, following a regulating action thereon, has reached the weighing conveyor, so that the weighing of such load or portion of the stream will determine whether any further regulation of the material is necessary to bring the loads or the stream of material to the predetermined desired weight.

I claim as my invention:—

1. In a weighing machine having a travelling weigh conveyor and means for feeding material thereto, means governed by the weight of material on the weigh conveyor and operative at periods in definite relation with the travel of the weigh conveyor through successive distances, each of the same certain length, to control the rate of feed of material to the weigh conveyor.

2. In a weighing machine having a travelling weigh conveyor having weighing means responsive to the weight of material thereon, and feeding means for said conveyor adjustable to feed material thereto at different rates, controlling means for said feeding means governed by the weight of material on the weigh conveyor and having means for rendering it operative periodically in definite relation with the travel of the weigh conveyor through successive distances each of the same certain length and which determine definite weighing periods.

3. In a weighing machine having a feed conveyor, and a cooperative weigh conveyor to receive material therefrom and having means for weighing the material thereon, means responsive to the weight of material on the weigh conveyor and synchronized to operate intermittently in accordance with the advance of the weigh conveyor through successive distances, each of the same certain length, for automatically regulating the feed of material to the rate of feed conveyor.

4. In a machine of the class described, the combination of a feed conveyor having means adjustable to variably supply material thereto, a continuously travelling weigh conveyor to receive and weigh material from the feed conveyor, regulating means responsive to weight of material on the weigh conveyor for adjusting the rate of feed of material by the supply means, and means for rendering said regulating means operative periodically at definite equal intervals in the travel of the weigh conveyor.

5. In a machine of the class described, the combination of a feed conveyor having means adjustable to variably supply material thereto, a continuously travelling weigh conveyor to receive and weigh material from the feed conveyor, regulating means responsive to weight of material on the weigh conveyor for adjusting the rate of feed of material by the supply means, and means coordinated to the travel of the weigh conveyor and operative periodically at definite equal intervals in the travel thereof to cause adjustment operation of the regulating means by increments.

6. In a weighing machine having a weigh conveyor having means for weighing material thereon and means for feeding material thereto, electric switch means responsive to said weighing means, means controlled by said switch means for increasing or decreasing the rate of feed of material to the weigh conveyor, and means for rendering said switch means operative periodically in accordance with the advance of the weigh conveyor through successive distances each of the same length and which determine the weighing periods.

7. In a weighing machine having a travelling weigh conveyor for weighing material thereon and means for feeding material thereto, switch means responsive to weight of material on said conveyor, means controlled by the switch means for varying the rate of feed of material to the weigh conveyor, and means synchronized to operate at definite equal intervals in the travel of the weight conveyor which determine weighing periods, for rendering said switch means operative periodically.

8. In a weighing machine having a travelling feed conveyor, a feed gate adjustable to vary the depth of material supplied thereto, a travelling weigh conveyor arranged to receive material from the feed conveyor and having means for weighing material thereon, a reversely-operative device for adjusting the feed gate, controlling means for said device governed by the weighing means, and means for rendering said controlling means operative periodically in definite relation with each same definite length of travel of the weigh conveyor.

9. In a weighing machine having a travelling feed conveyor, a feed gate adjustable to vary the depth of material supplied thereto, a travelling weigh conveyor arranged to receive material from the feed conveyor and having means for weighing material thereon, a reversely-operative electrically operative device for adjusting the feed gate, electric switch means for said device governed by the weighing means, and a synchronizing electric switch controlling said switch means and operative at intervals in the travel of the weigh conveyor.

10. A weighing machine according to claim 8, wherein said reversely-operative device comprises alternately operative solenoids and pawls and cooperative toothed wheels operative by the respective solenoids and connected to the feed gate for respectively moving it in one or the other direction.

11. In a weighing machine having a feed conveyor, a feed gate adjustable to control the supply of material thereto, a weigh conveyor arranged to receive material from the feed conveyor and weigh it, and means for driving the feed conveyor intermittently to measure the material into loads and for driving the weigh conveyor to advance and discharge the loads, means responsive to the weight of a load on the weigh conveyor for adjusting the feed gate, and means synchronized with the weighing of successive loads on the weigh conveyor for rendering said gate adjusting means operative periodically.

12. In a weighing machine having a travelling weigh conveyor having weighing means for weighing material thereon, and feed means adjustable to supply material thereto at different rates, to form separate loads, adjusting means for said feed means governed by said weighing means, and controlling means for said adjusting means synchronized with advances of the weigh conveyor, each through the same definite distance, and which determine the periods for weighing the loads by the weighing means.

13. In a weighing machine having a feed conveyor, feed means adjustable to variably supply material thereto, means for intermittently advancing the feed conveyor to measure the material into loads, a weigh conveyor arranged to receive the loads of material successively from the feed conveyor and having weighing means for weighing such loads, means responsive to said weighing means for adjusting said feed means, and means synchronized with the weighing of the loads by said weighing means for rendering said adjusting means operative synchronously therewith.

14. In a weighing machine having a feed conveyor, feed means adjustable to variably supply material thereto, a weigh conveyor arranged to receive material from the feed conveyor and having weighing means for weighing material thereon, and means for advancing said conveyors continuously to advance the material continuously in a stream, adjusting means for said feed means governed by said weighing means for varying the size of the stream of material, and means operative periodically during the advance of the weigh conveyor for rendering said adjusting means operative periodically.

15. In a weighing machine, the combination of a feed conveyor, a weigh conveyor, separate driving members operative respectively to advance the feed conveyor intermittently at different speeds to measure loads of different volumes and discharge them to the weigh conveyor, a counter, and actuating members for the counter having means for operatively connecting them individually to the respective driving members for the feed conveyor.

16. In a weighing machine having a travelling conveyor, means adjustable to vary the rate of feed of material thereto, means for weighing material on said conveyor, electrically-controlled means for adjusting said means which varies the rate of feed of material to said conveyor, and governing means for said electrically-controlled means embodying electric switch means controlled interdependently by the weight of material on said conveyor and by the travel of said conveyor through a predetermined distance.

17. In a weighing machine having a travelling conveyor, means adjustable to vary the rate of feed of material thereto, means for weighing material on said conveyor, electrically-controlled means for adjusting said means which varies the rate of feed of material to said conveyor, and governing means for said electrically-controlled means embodying electric switch means part of which is controlled by the weight of material on said conveyor and another part of which is controlled by the travel of said conveyor through a predetermined distance, and means connecting said parts of the switch means in series for interdependent control of said electrically-controlled means.

18. In a weighing machine having a travelling conveyor, means adjustable to vary the rate of feed of material thereto, means for weighing material on said conveyor, electrically-controlled means for adjusting said means which varies the rate of feed of material to said conveyor, and governing means for said electrically-controlled means embodying electric switch means part of which is controlled in response to the weight of material on said conveyor and another part of which is connected to said conveyor to operate in coordination with successive distances of travel thereof.

19. In a weighing machine having a travelling conveyor, means adjustable to vary the rate of feed of material thereto, means for weighing material on said conveyor, electrically-controlled means for adjusting said means which varies the rate of feed of material to said conveyor, and governing means for said electrically-controlled means embodying electric switch means electrically connected to said electrically-controlled means, said switch means including contact elements having means for closing them in response to an underweight or overweight of material on said conveyor and other contact elements having means for closing them in response to the travel of said conveyor through a predetermined distance.

20. In a weighing machine having a travelling conveyor provided with weighing means for weighing material thereon, means for supplying material to said conveyor and adjustable to vary the rate of supply, electrically-controlled means for adjusting said supply means to increase or decrease the rate of supply of the material to said conveyor, and governing means for said electrically-controlled means embodying a pair of switch elements which are rendered active in response respectively to underweight or overweight of material on said conveyor but both of which are inactive in response to a predetermined weight of material on said conveyor, and a switch element connected to said conveyor to be operated periodically in coordination with predetermined distances of advance thereof to render one or the other of said pair of switch elements operative at corresponding periods.

21. In a machine of the class described, the combination of a feed conveyor, a cooperative weigh conveyor to receive and weigh loads of material therefrom, means for advancing the feed conveyor through a definite distance independently of the weighing operation of the weigh conveyor to measure volumetrically a predetermined quantity of material, means for varying the volume of the loads measured by the feed conveyor, and means governed by the weight of a load of material on the weigh conveyor and operative periodically in accordance with a definite distance of advance of the feed conveyor for adjusting said volume varying means.

22. In a machine of the class described, the combination of a feed conveyor, a cooperative weigh conveyor to receive and weigh loads of material therefrom, means for advancing the feed conveyor a definite distance periodically independently of the weighing operation of the weigh conveyor to measure volumetrically predetermined loads of material and deposit them on the weigh conveyor for weighing, means for varying the volume of the loads measured by the feed conveyor, and means governed by the weight of a load of material on the weigh conveyor and having means for rendering it operative synchronously with the weighing of the loads of material by the weigh conveyor for adjusting said load varying means.

STANLEY G. MURRAY.